US009863626B2

(12) United States Patent
Lan et al.

(10) Patent No.: US 9,863,626 B2
(45) Date of Patent: Jan. 9, 2018

(54) LAMP HOLDER AND MANUFACTURING METHOD THEREOF AND ILLUMINATING DEVICE HAVING THE LAMP HOLDER

(71) Applicant: OSRAM GmbH, Munich (DE)

(72) Inventors: Tingbiao Lan, Shenzhen (CN); Rencheng Li, Shenzhen (CN); Jing Lin, Shenzhen (CN); Qihui Zhang, Shenzhen (CN)

(73) Assignee: LEDVANCE GmbH (DE)

( * ) Notice: Subject to any disclaimer, the term of this patent is extended or adjusted under 35 U.S.C. 154(b) by 120 days.

(21) Appl. No.: 14/898,753

(22) PCT Filed: Jun. 12, 2014

(86) PCT No.: PCT/EP2014/062247
§ 371 (c)(1),
(2) Date: Dec. 16, 2015

(87) PCT Pub. No.: WO2014/202460
PCT Pub. Date: Dec. 24, 2014

(65) Prior Publication Data
US 2016/0138793 A1 May 19, 2016

(30) Foreign Application Priority Data
Jun. 19, 2013 (CN) .......................... 2013 1 0244192

(51) Int. Cl.
*F21V 15/01* (2006.01)
*F21V 29/00* (2015.01)
(Continued)

(52) U.S. Cl.
CPC .............. *F21V 29/713* (2015.01); *F21K 9/23* (2016.08); *F21K 9/237* (2016.08); *F21K 9/90* (2013.01);
(Continued)

(58) Field of Classification Search
CPC ........ F21V 29/713; F21V 29/87; F21V 29/89; F21V 29/20; F21V 15/01; F21V 15/012;
(Continued)

(56) References Cited

U.S. PATENT DOCUMENTS 8,500,301 B2 * 8/2013 Duan .................... F21V 29/004 313/318.01
9,016,899 B2 * 4/2015 Holland .................. B23P 15/26 362/249.02
(Continued)

FOREIGN PATENT DOCUMENTS

CN 102913785 A 2/2013
DE 102011086789 A1 5/2013
(Continued)

OTHER PUBLICATIONS

Kon, Tatsuichiro, Jan. 27, 2011, WO2011010535(A1), Espacenet machine translation, pp. 1-79.*
(Continued)

*Primary Examiner* — Alan Cariaso
(74) *Attorney, Agent, or Firm* — Hayes Soloway PC

(57) ABSTRACT

Various embodiments may relate to a lamp holder of a lighting module, including a first housing and a second housing made from different materials, wherein the second housing includes a body part and an assembling part in thermal contact with each other, wherein the second housing is embedded integrally in the first housing and in thermal contact with the first housing, and the assembling part and the body part are installed together. In addition, various embodiments further relate to a method for manufacturing the lamp holder and an illuminating device having the lamp holder.

19 Claims, 4 Drawing Sheets

(51) Int. Cl.

| | |
|---|---|
| ***F21V 29/71*** | (2015.01) |
| ***F21K 9/237*** | (2016.01) |
| ***F21K 9/90*** | (2016.01) |
| ***F21V 29/87*** | (2015.01) |
| ***F21V 29/89*** | (2015.01) |
| ***F21K 9/23*** | (2016.01) |
| *F21Y 115/10* | (2016.01) |

(52) U.S. Cl.
CPC .............. *F21V 15/01* (2013.01); *F21V 29/20* (2013.01); *F21V 29/87* (2015.01); *F21V 29/89* (2015.01); *F21Y 2115/10* (2016.08)

(58) Field of Classification Search
CPC . F21V 15/013; F21K 9/23; F21K 9/90; F21K 9/237
See application file for complete search history.

(56) References Cited

U.S. PATENT DOCUMENTS

2012/0057371 A1* 3/2012 Kai ........................... F21V 3/00 362/646
2013/0294085 A1 11/2013 Watanabe et al.
2014/0104858 A1* 4/2014 Holland .................. B23P 15/26 362/369

FOREIGN PATENT DOCUMENTS

| | | | |
|---|---|---|---|
| EP | 2667090 | A1 | 11/2013 |
| JP | 2012234628 | A | 11/2012 |
| TW | 201250154 | A | 12/2012 |
| WO | 2011010535 | A1 | 1/2011 |
| WO | 2012099251 | A1 | 7/2012 |
| WO | 2013156511 | A1 | 10/2013 |
| WO | 2013183198 | A1 | 12/2013 |

OTHER PUBLICATIONS

Oktavia et al, Dec. 16, 2012, TW201250154(A), machine translation, pp. 1-23.*
Lipowsky et al, May 23, 2013, DE102011086789(A1), Patent Translate by EPO and Google, pp. 1-25.*
International Search Report based on PCT/EP2014/062247 (5 pages) dated Aug. 1, 2014.

* cited by examiner

LAMP HOLDER AND MANUFACTURING METHOD THEREOF AND ILLUMINATING DEVICE HAVING THE LAMP HOLDER

RELATED APPLICATIONS

The present application is a national stage entry according to 35 U.S.C. §371 of PCT application No.: PCT/EP2014/062247 filed on Jun. 12, 2014, which claims priority from. Chinese application No.: 201310244192.6 filed on Jun. 19, 2013, and is incorporated herein by reference in its entirety.

TECHNICAL FIELD

Various embodiments relate to a lamp holder and a method for manufacturing the lamp holder and an illuminating device including the lamp holder.

BACKGROUND

In the manufacturing process of modern electronic device, especially LED illuminating device, the injection molding, especially the overmolding process, is used more and more for manufacturing the lamp holder of the illuminating device. By manufacturing through such processes, the lamp holder not only can realize good heat exchange, but also can guarantee good insulation property of the illuminating device. In the prior art, a hybrid illuminating device made from metal and plastic is usually used as the lamp holder of the illuminating device. Such lamp holder has a first housing of metal and a second housing of plastic wrapping the outside of the first housing. Thus, with the aid of the thermal conduct property of metal, heat inside the illuminating device can be highly effectively and quickly transferred to the second housing so as to achieve good heat dissipation effect. Moreover, since the electrically insulating second housing wraps the outside of the first housing of metal, the first housing can be electrically insulating from the outside.

For this hybrid heat dissipation device configured as a lamp holder, the first housing made from a metal material, for instance, usually should be made integrally through a process similar to die casting; therefore, a high defective rate is always resulted from the manufacturing process. Moreover, due to requirements of the die casting process to the equipment and manufacturing time, etc., the manufacturing cost thereof also cannot be ignored.

SUMMARY

Various embodiments provide a lamp holder of a lighting module. Such lamp holder is easily manufactured and has a low cost, and therefore can reduce the defective rate resulted from the manufacturing process.

The lamp holder of a lighting module provided according to the present disclosure include a first housing and a second housing made from different materials, characterized in that the second housing includes a body part and an assembling part in thermal contact with each other, wherein the second housing is embedded integrally in the first housing and in thermal contact with the first housing, and the assembling part and the body part are installed together. By designing the second housing in a two-part structure, the body part and the assembling part can be manufactured individually through various processes, respectively, moreover, by means of the thermal contact between the first housing and the second housing, the thermal conductivity of the lamp holder can be ensured to meet requirements in application circumstances. Therefore, various problems such as too high cost and high defective rate brought by, for instance, the die casting process in the conventional manufacturing process can be advantageously avoided.

According to various embodiments, the body part is made from a metal through a first process, and the assembling part is made from a metal through a second process. By manufacturing the body part and the assembling part through different processes, appropriate processes can be chosen according to the specific structures of the two parts, thereby improving the yield in the manufacture.

According to various embodiments, the body part is configured as a metal stamping part, and the assembling part is configured as a metal extrusion part. To manufacture the assembling part through the extrusion process can apparently save the cost relative to the die casting process.

According to various embodiments, the body part and the assembling part are installed together in a manner of interference fit. Consequently, assembling of the second housing is realized without additional fastener or connector.

According to various embodiments, the body part and the assembling part are nested together. Stresses pressing each other are present between the body part and the assembling part nested therein.

According to various embodiments, an outer circumferential wall of the assembling part is against an inner circumferential wall of the body part.

According to various embodiments, an end region of the body part facing to a light emergent side of the lighting module surrounds the assembling part.

According to various embodiments, the body part is configured as a cup, wherein the assembling part is embedded in an end region of the body part having a bigger cross section, and an end region of the body part having a smaller cross section is embedded in the first housing. That is to say, the major-diameter end of the body part is configured for fixed connection with the assembling part, and the remaining parts, especially the minor-diameter end, can be completely embedded in the first housing.

According to various embodiments, the body part and the assembling part are made from a rigid material. Therefore, interference fit between the body part and the assembling part can be ensured, moreover, the second housing formed thereby has a fixed profile.

According to various embodiments, the body part and the assembling part are made from aluminum. Aluminum has the advantages of low density and good thermal conduct effect and therefore is fit for manufacturing the second housing. Of course, other suitable metal materials also can be taken into consideration for manufacturing, or different metal materials also can be taken into consideration for manufacturing separately, the body part and the assembling part.

According to various embodiments, the body part and the assembling part are installed together in a manner of thermal expansion and contraction. For instance, the body part can be heated to slightly increase the major-diameter end thereof, thereby the assembling part can be successfully embedded therein, and then it is quickly cooled to ensure formation of interference fit between the body part and the assembling part.

According to various embodiments, the body part and the assembling part are installed together in a manner of stamping.

According to various embodiments, the first housing is a cup, and an inner circumferential wall of the first housing defines an accommodation cavity for placing the lighting module.

According to various embodiments, the assembling part is configured as a ring part, wherein the inner circumferential wall of the assembling part can be configured for connection or contact with parts which need to be fixed in the lamp holder.

According to various embodiments, a stop portion for the assembling part is in an end region of the first housing facing to a light emergent side of the lighting module. Thereby, an anti-stripping structure is formed in an axial direction, preventing the second housing from escaping from the first housing.

According to various embodiments, the stop portion extends radially inwardly, and the assembling part is sandwiched axially between the stop portion and an end surface of an inner circumferential wall of the first housing.

According to various embodiments, at least one groove is formed on an inner wall of the assembling part. The groove can be configured as accommodation groove for receiving fasteners such as screws or the like, as a result, the lamp holder, especially the assembling part, can be ensured to be in fixed connection with parts which need to be fixed in the lamp holder.

According to various embodiments, a plurality of grooves are formed on the inner wall of the assembling part, and the plurality of grooves are distributed uniformly in a circumferential direction. Therefore, it can be ensured that the lamp holder can be in uniform and circumferentially full fixed connection with parts which need to be fixed in the lamp holder.

According to various embodiments, the first housing is made from a plastic. Advantageously, the first housing and the second housing are formed in one piece through an overmolding process.

According to various embodiments, the lamp holder is a heat sink. The lamp holder can support, protect and radiate heat for the lighting module accommodated therein.

In addition, the present disclosure further relates to a method for manufacturing the above lamp holder, including:

a) providing the body part and the assembling part for forming the second housing;

b) fixing together, by interference fit, the body part and the assembling part which are in thermal contact with each other so as to form the second housing; and c) moulding an insulating first housing on the second housing, wherein the second housing is at least partly embedded in the first housing and is in thermal contact with the first housing so as to form the lamp holder.

By manufacturing in two parts the second housing in this hybrid lamp holder, the manufacturing cost of the second housing, or the whole lamp holder, can be reduced, and the yield in the manufacture of the lamp holder is improved.

According to various embodiments, in step a) the assembling part is made through an extrusion process, and the body part is made through a stamping process.

According to various embodiments, in step b) the body part and the assembling part are nested together.

According to various embodiments, in step c) the first housing is made from a plastic, wherein an overmolding process is used to enable the first housing to wrap the second housing in one piece.

The present disclosure further relates to an illuminating device, including a lighting module, characterized by further including the above lamp holder.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed description, reference is made to the accompanying drawings, which form a part hereof, and in which are shown by way of illustration specific embodiments in which the invention may be practiced. In this regard, directional terminology, such as "top", "bottom", "inner", "outer", is used in reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
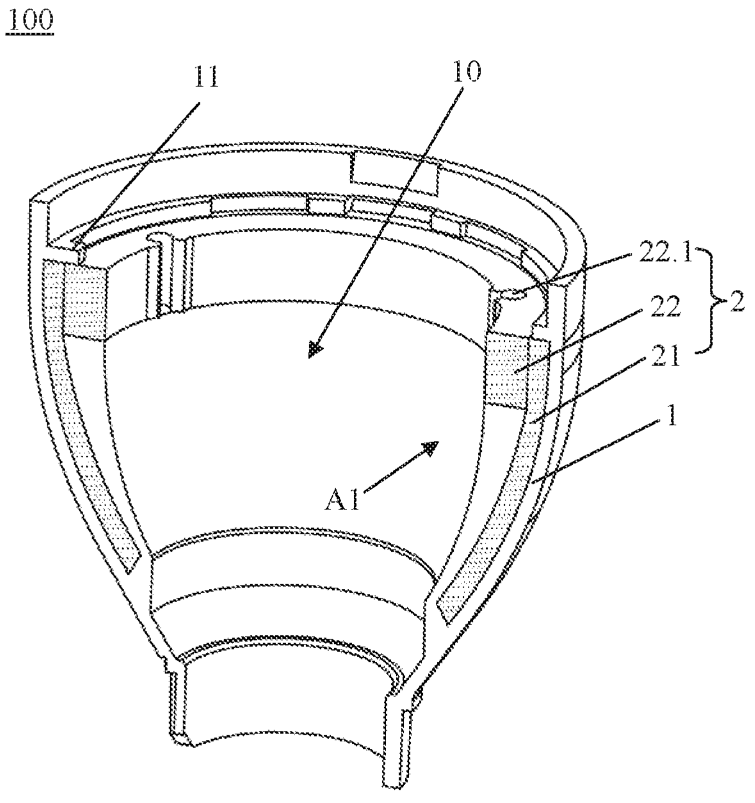
FIG. 1 shows a 3D sectional view of a first embodiment of a lamp holder according to various embodiments.

FIG. 1 shows a 3D sectional view of a first embodiment of a lamp holder according to the present disclosure. A lamp holder 100 includes a first housing 1 and a second housing 2, wherein the first housing 1 is an insulating housing made from a plastic, and the second housing 2 is a metal housing made from a metal. Therefore, the overmolding process can be preferably used to enable the first housing 1 to wrap and to be formed integrally with the second housing 2. In cases where the first housing 1 is made from a thermal conductive plastic, the lamp holder 100 can dissipate heat for a lighting module installed therein, and therefore can be a heat sink.

According to the present disclosure, the second housing 2 includes a body part 21 and an assembling part 22 in thermal contact with each other, wherein the assembling part 22 and the body part 21 are installed together such that the second housing 2 can be integrally embedded in the first housing 1. In this situation, the thermal contact between the second housing 2 and the first housing 1 can be realized. In an end region of the first housing 1 facing to a light emergent side of the lighting module (not shown), i.e. in the upper part of the figure, there is a stop portion 11 for the assembling part 22. The stop portion 11 extends radially inwardly starting from an inner wall of the first housing 1 so as to form a ring structure. The assembling part 22 is sandwiched axially between the stop portion 11 and an end surface of an inner circumferential wall Al. Thus, it can be ensured that the assembling part 22 is located in a fixed position in the first housing 1 so as to prevent the second housing 2, when influenced by an external force, from stripping from the first housing 1.

In the present embodiment, the lamp holder 100 is configured as a cup with a cross section which is circular. However, it also can be taken into consideration that in a second embodiment not shown, the lamp holder is configured as a cup with a square cross section, or other rotationally symmetric cups. Besides, in a third embodiment not shown, the body part also can have a cylindrical profile.

Figure 2:
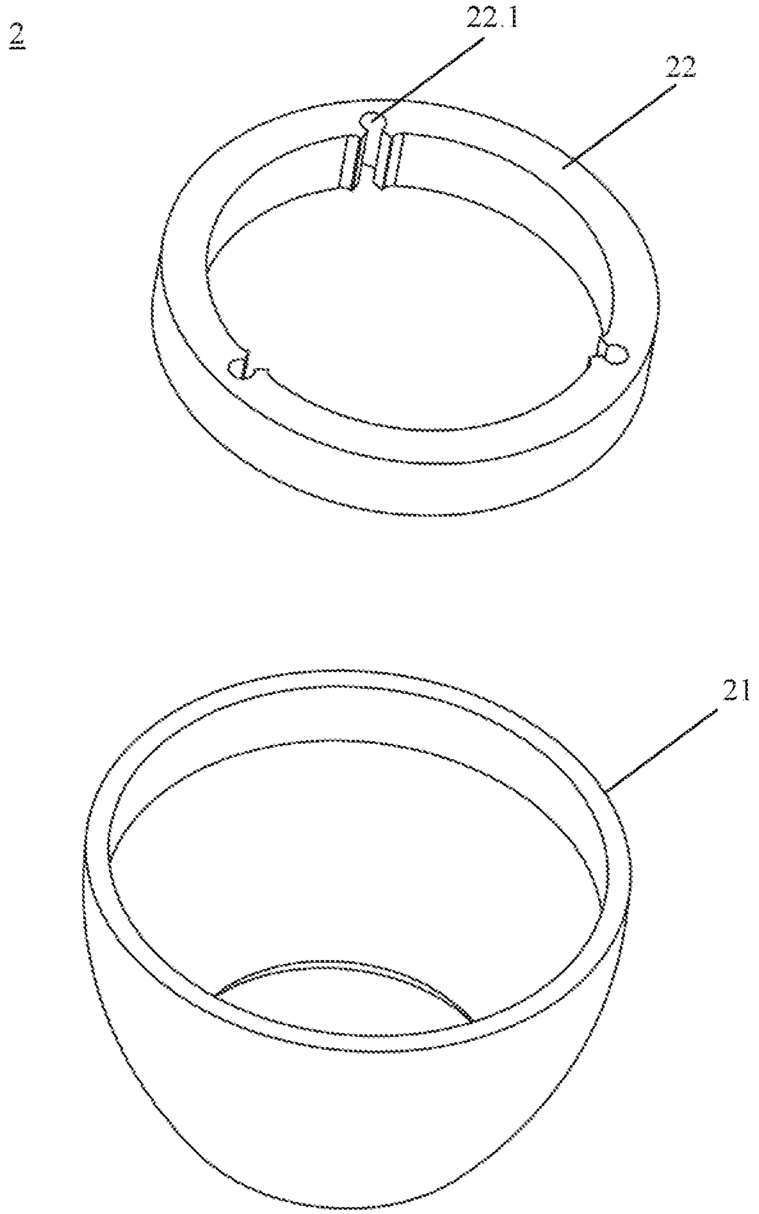
FIG. 2 shows a 3D exploded view of a second housing of the lamp holder as shown in FIG. 1.

FIG. 2 shows a 3D exploded view of the second housing of the lamp holder as shown in FIG. 1. The body part 21 and the assembling part 22 which can be made from the same or different metals are manufactured through different processes. In order to ensure that the body part 21 and the assembling part 2 can be stably assembled as en entirety, a rigid material is particularly chosen for manufacturing the body part 21 and the assembling part 22. In the present embodiment, the body part 21 is configured as a cup-shaped metal stamping part, and the assembling part 22 is configured as a metal extrusion part. In order to ensure good heat dissipation effect and small dead weight of the lamp holder 100, the body part 21 and the assembling part 22 are preferably made from aluminum.

The inner circumferential wall Al of the first housing 1 defines an accommodation cavity 10 for placing the lighting module 201. Corresponding to the section of the accommodation cavity 10, the assembling part 22 is configured as a ring part. On an inner wall of the assembling part 22, three grooves 22.1 distributed uniformly in the circumferential direction are formed. The grooves 22.1 can be configured as accommodation grooves for receiving fasteners such as screws or the like, as a result, the lamp holder 100, especially the assembling part 22, can be ensured to be in fixed connection with parts which need to be fixed in the lamp holder 100.

In another embodiment not shown, the number of the grooves can be two or more than three, and the grooves also can be configured as thread grooves or grooves of other types.

Figure 3:
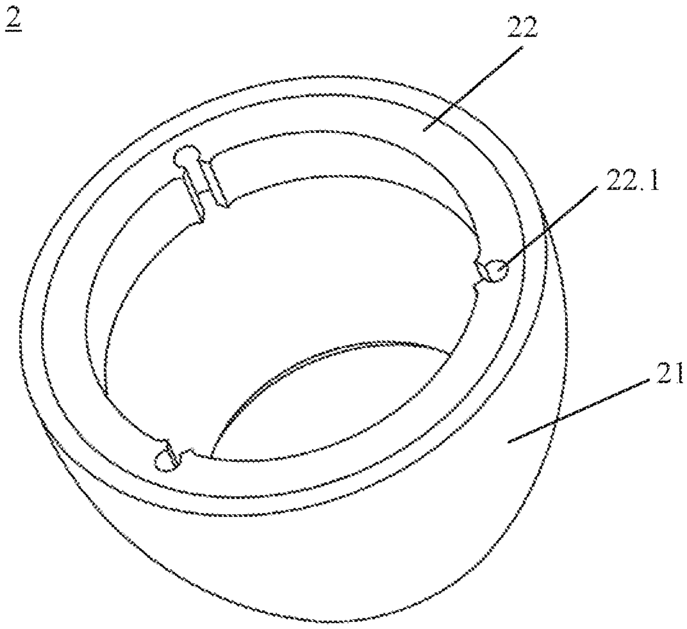
FIG. 3 shows a 3D view of the second housing as shown in FIG. 1 after assembling.

FIG. 3 shows a 3D view of the second housing 2 as shown in FIG. 1 after assembling. In order to decrease the number of parts of the lamp holder and reduce the manufacturing cost, the body part 21 and the assembling part 22 can be installed together merely in a manner of interference fit without additional fastener. Thus, the fixed connection manners such as soldering, bonding or bolted connection for integrating the body part 21 and the assembling part 22 can be omitted.

For instance, the body part 21 and the assembling part 22 can be installed together in a manner of heat expansion and cold contraction. After the assembling part 22 is put into a major-diameter end of the body part 21 which expands with heat, the body part 21 is cooled to contract radially inwardly. Consequently, an end region of the body part 21 facing to the light emergent side of the lighting module, i.e. the end region of the body part 21 oriented upwardly, surrounds the assembling part 22, and meanwhile, an outer circumferential wall of the assembling part 22 is against the inner circumferential wall of the body part 21.

Other processes also can be taken into consideration to install the body part 21 and the assembling part 22 together, for example, it can be realized with the aid of stamping.

Figure 4:
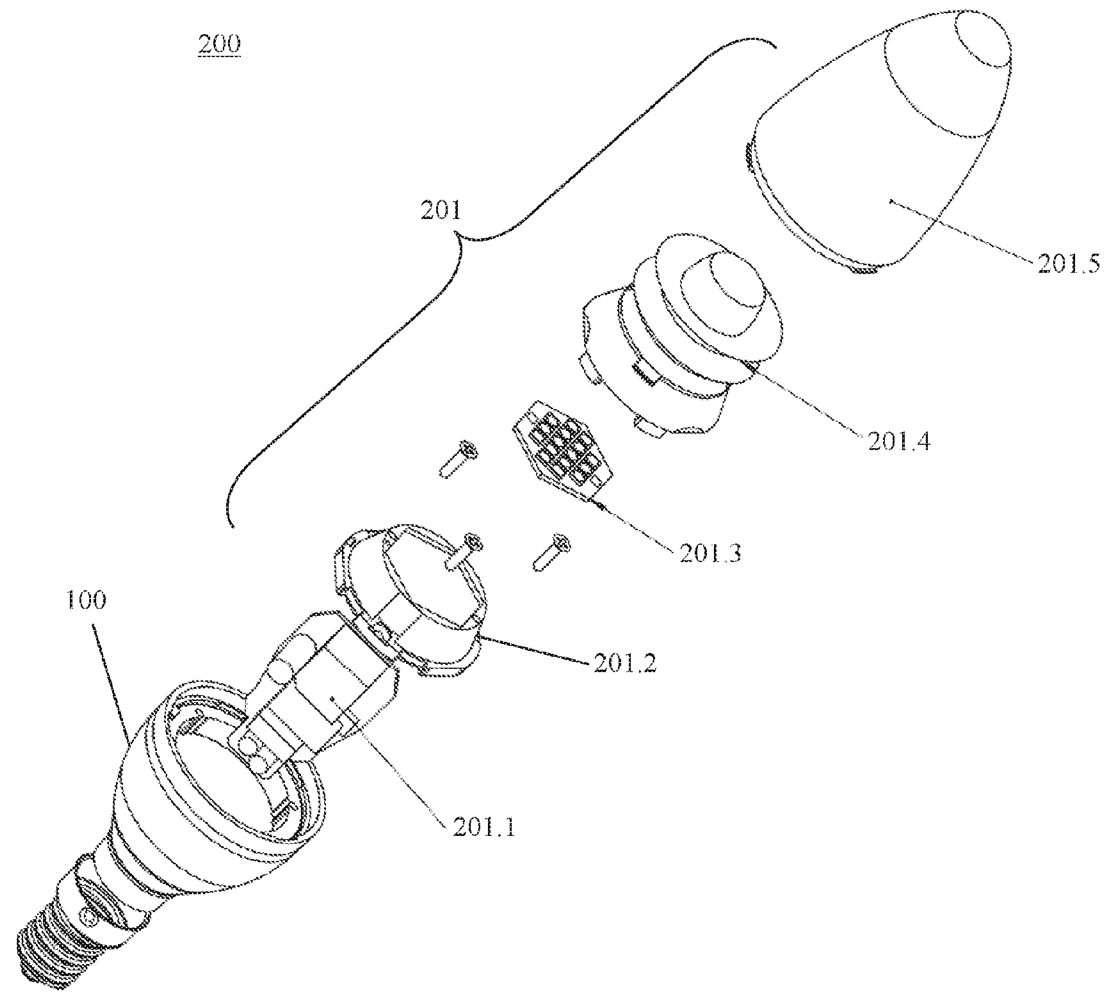
FIG. 4 shows a 3D exploded view of an illuminating device according to various embodiments.

FIG. 4 shows a 3D exploded view of an illuminating device 200 according to the present disclosure. Apart from the lamp holder 100 already shown in FIG. 1, the lighting module 201 which needs to be installed together with the lamp holder 100 is also shown, including a driver 201.1, a support 201.2, a light engine 201.3, a lens 201.4 and a lamp cover 201.5. The above parts are installed in turn and inserted into the lamp holder 100 so as to form the complete illuminating device 200.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lamp holder of a lighting module, comprising a first housing and a second housing made from different materials, wherein the second housing comprises a body part and an assembling part in thermal contact with each other, wherein the second housing is embedded integrally in the first housing and in thermal contact with the first housing, and the assembling part and the body part are installed together, wherein the body part and the assembling part are separate components and are nested together such that an outer circumferential wall of the assembling part contacts an inner circumferential wall of the body part, thereby connecting the body part and the assembling part in an interference fit.

2. The lamp holder according to claim 1, wherein the body part is made from a metal through a first process, and the assembling part is made from a metal through a second process.

3. The lamp holder according to claim 2, wherein the body part and the assembling part are installed together in a manner of interference fit.

4. The lamp holder according to claim 1, wherein the body part is configured as a metal stamping part, and the assembling part is configured as a metal extrusion part.

5. The lamp holder according to claim 1, wherein an end region of the body part facing to a light emergent side of the lighting module surrounds the assembling part.

6. The lamp holder according to claim 1, wherein the body part is configured as a cup, wherein the assembling part is embedded in an end region of the body part having a bigger cross section, and an end region of the body part having a smaller cross section is embedded in the first housing.

7. The lamp holder according to claim 1, wherein the body part and the assembling part are made from a rigid material.

8. The lamp holder according to claim 7, wherein the body part and the assembling part are made from aluminum.

9. The lamp holder according to claim 1, wherein the body part and the assembling part are installed together in a manner of thermal expansion and contraction.

10. The lamp holder according to claim 1, wherein the body part and the assembling part are installed together in a manner of stamping.

11. The lamp holder according to claim 1, wherein the first housing is a cup, and an inner circumferential wall of the first housing defines an accommodation cavity for placing the lighting module.

12. The lamp holder according to claim 1, wherein the assembling part is configured as a ring part.

13. The lamp holder according to claim 12, wherein a stop portion for the assembling part is provided in an end region of the first housing facing to a light emergent side of the lighting module.

14. The lamp holder according to claim 13, wherein the stop portion extends radially inwardly, and the assembling part is sandwiched axially between the stop portion and an end surface of an inner circumferential wall of the first housing.

15. A method for manufacturing a lamp holder for a lighting module, the method comprising:

providing a body part and an assembling part as separate components for forming a second housing;

fixing together, by interference fit, the body part and the assembling part such that an outer circumferential wall of the assembling part contacts an inner circumferential wall of the body part, wherein the body part and the assembling part are in thermal contact with each other so as to form the second housing; and moulding an insulating first housing on the second housing, wherein the second housing is at least partly embedded in the first housing and is in thermal contact with the first housing so as to form the lamp holder.

16. The method according to claim 15, wherein the assembling part is made through an extrusion process, and the body part is made through a stamping process.

17. The method according to claim 15, wherein the body part and the assembling part are nested together.

18. The method according to claim 15, wherein the first housing is made from a plastic, wherein an overmolding process is used to enable the first housing to wrap the second housing in one piece.

19. A lamp holder of a lighting module, comprising a first housing and a second housing made from different materials, wherein the second housing comprises a body part and an assembling part in thermal contact with each other, wherein the second housing is embedded integrally in the first housing and in thermal contact with the first housing, and the assembling part and the body part are installed together, wherein the assembling part has a ring shape, wherein the body part and the assembling part are separate components and are nested together such that an outer circumferential wall of the assembling part contacts an inner circumferential wall of the body part, thereby connecting the body part and the assembling part in an interference fit.

* * * * *